(12) United States Patent
Davis et al.

(10) Patent No.: US 6,705,123 B2
(45) Date of Patent: Mar. 16, 2004

(54) MAKING A PHOTOSENSITIVE FIBER WITH COLLAPSE OF A MCVD TUBE THAT IS IN A SMALL POSITIVE PRESSURE ATMOSPHERE

(75) Inventors: Monica K. Davis, Belmont, MA (US); Gang Qi, Painted Post, NY (US)

(73) Assignee: Corning Incorporated, Corning, NY (US)

(*) Notice: Subject to any disclaimer, the term of this patent is extended or adjusted under 35 U.S.C. 154(b) by 0 days.

(21) Appl. No.: 09/821,474

(22) Filed: Mar. 30, 2001

(65) Prior Publication Data

US 2002/0139151 A1 Oct. 3, 2002

(51) Int. Cl.[7] .............................................. C03B 37/027
(52) U.S. Cl. .............................. 65/379; 65/419; 65/425
(58) Field of Search ......................... 65/419, 477, 425, 65/379

(56) References Cited

U.S. PATENT DOCUMENTS

| | | | |
|---|---|---|---|
| 4,165,224 A | 8/1979 | Irven et al. .................... 65/3 A |
| 4,217,027 A | 8/1980 | MacChesney et al. ..... 350/96.3 |
| 4,304,581 A | 12/1981 | Saifi ........................... 65/3.12 |
| 4,426,129 A | * 1/1984 | Matsumura ............... 350/96.33 |
| 4,465,708 A | * 8/1984 | Fanucci ....................... 65/419 |
| 5,745,615 A | * 4/1998 | Atkins ......................... 65/425 |
| 5,763,081 A | * 6/1998 | Ohga ........................... 65/397 |
| 5,917,109 A | 6/1999 | Berkey ........................ 65/412 |
| 5,948,202 A | 9/1999 | Miller ......................... 156/344 |
| 5,961,682 A | 10/1999 | Lee et al. ..................... 65/384 |
| 6,105,396 A | 8/2000 | Glodis et al. ................. 65/377 |
| 6,201,917 B1 | * 3/2001 | Campion ..................... 65/417 |

FOREIGN PATENT DOCUMENTS

| | | | |
|---|---|---|---|
| EP | 0 495 605 A | 7/1992 | ............ G02B/6/16 |
| EP | 0 849 231 A1 | 6/1998 | |

OTHER PUBLICATIONS

QLM9P48 Series OptiLock™ 908 nm Fiber Bragg Grating Stabilized Pump Lasers, Coming Lasertron 2000 Products Guide, pp. 14–16.

Turan Erdogan, *Fiber Grating Spectra*, Journal of Lightwave Technology, vol. 15, No. 8, pp. 1277–1294 (Aug. 1997).

Paul J. Lemaire et al., *High Pressure $H_2$ Loading As A Technique For Achieving Ultrahigh UV Photosensitivity and Thermal Sensitivity in $GeO_2$ Optical Fibres*, Electronics Letters, vol. 29, No. 13, pp. 1191–1192 (Jun. 24, 1993).

Paul J. Lemaire and T. Erdogan, *Hydrogen–enhanced UV photosensitivity of optical fibers: Mechanisms and reliability*, Conference on Bragg Gratings, Photosensitivity, and Polling in Glass Waveguides, Portland, OR paper SuA4, pp. 78–81, (1995).

Randal Salvatore et al., *Fiber–Bragg–Stabilized Lasers Power Amplifiers for DWDM*, Laser Focus World, , pp. 113–118 (Nov. 1999).

K. Shima et al., *A Novel Temperature–Insensitive Long–Period Fiber Grating Using A Boron–Codoped–Germanosilicate–Core Fiber*, OFC '97 Technical Digest, pp. 347–34, (1997).

(List continued on next page.)

Primary Examiner—John Hoffmann
(74) Attorney, Agent, or Firm—Gregory V. Bean; Svetlana Z. Short

(57) ABSTRACT

The present invention includes a method of making a preform for an enhanced photosensitive fiber comprising depositing successive layers of optical material the inside a tube using modified chemical vapor deposition, and collapsing the layers of optical material in a reducing atmosphere with a positive pressure. The present invention also includes a method of making an enhanced photosensitive fiber comprising making a preform using modified chemical vapor deposition wherein the preform is collapsed in a reducing atmosphere with a positive pressure and drawing the preform into a fiber.

22 Claims, 5 Drawing Sheets

OTHER PUBLICATIONS

Katsuyama T et al, "Reduced Pressure Collapsing MCVD Method for Single Polarisation Opitcal Fibres" Journal of Lightwave Technology, IEEE. vol. LT–2, No. 5, Oct. 1984, pp. 634–639, XP002118844.

Patent Abstracts of Japan, vol. 10, No. 13, Jan. 18, 1986 & JP 60 166244A *Fujitsu Co Ltd), Aug. 29, 1985.

B.F. Ventrudo et al., *Wavelength And Intensity Stabilisation Of 980nm Diode Lasers Coupled To Fibre Bragg Gratings*, Electronics Letters, vol. 30, No. 25, pp. 2147–2149 (Dec. 8, 1994).

D.L. Williams et al., *Enhanced UV Photosensitivity in Boron Codoped Germanosilicate Fibers*, Electronics Letters, vol. 29, No. 1, pp. 45–47 (Jan. 7, 1993).

* cited by examiner

Figure 7

| Fiber | GeO$_2$ (area avg., wt%) | Other (area avg., wt%) | Draw temp. (C) | Draw tens. (g) | O$_2$/Cl$_2$ 300/50 sccm | GeCl$_4$ 50-280 sccm | 2-propanol | He 300 sccm | η | Growth type | 15' δn$_{MOD}$ |
|---|---|---|---|---|---|---|---|---|---|---|---|
| IV-20 | 16.2 | | 2035 | 90 | • | 50 | | | 0.86 | Mono | 1.26 10$^{-4}$ |
| IV-27 | 25.3 | | 2035 | 90 | • | 100 | | | 0.91 | Mono | 1.44 10$^{-4}$ |
| IV-30 | 17.04 | | 2035 | 90 | • | 100 | | | 0.91 | Mono | 1.42 10$^{-4}$ |
| IV-46 | | | 2035 | 90 | • | 75 | | | 0.82 | Mono | *3.8 10$^{-5}$ |
| IV-50 | 36.5 | | 2035 | 90 | • | 280 | | | 0.87 | Mono | 3.6-4.1 10$^{-4}$ |
| IV-58 | 28.4 | | 2035 | 90 | • | 280 | | | 0.87 | Mono | 4.3-4.9 10$^{-4}$ |
| IV-68 | 8.40 | 3.7 P$_2$O$_5$ | 2035 | 90 | • | 50 | | | 0.59 | Mono | 1.71 10$^{-4}$ |
| IV-131 | 22.40 | | 2035 | 30 | (1,2) | 80 (1,2) | | (3) | 0.77 | mono | 4.35 10$^{-4}$ |
| IV-131 | 22.40 | | 2035 | 90 | (1,2) | 80 (1,2) | | (3) | 0.77 | mono | 4.36 10$^{-4}$ |
| IV-131 | 22.40 | | 2035 | 200 | (1,2) | 80 (1,2) | | (3) | 0.77 | mono | 5.46 10$^{-4}$ |
| IV-135 | 13.67 | | 2035 | 30 | • | • | | | 0.76 | mono | 3.72 10$^{-4}$ |
| IV-135 | 13.67 | | 2035 | 30 | • | • | | | 0.76 | mono | 3.59 10$^{-4}$ |
| IV-135 | 13.67 | | 2035 | 90 | • | • | | | 0.76 | mono | 3.45 10$^{-4}$ |
| IV-135 | 13.67 | | 2035 | 200 | • | • | | | 0.76 | mono | 4.22 10$^{-4}$ |
| IV-136 | 15.35 | | 2035 | 30 | • | • | • RT | | 0.84 | mono | 3.24 10$^{-4}$ |
| IV-136 | 15.35 | | 2035 | 90 | • | • | • RT | | 0.84 | mono | 3.39 10$^{-4}$ |
| IV-136 | 15.35 | | 2035 | 200 | • | • | • RT | | 0.84 | mono | 4.07 10$^{-4}$ |
| IV-137 | 24.40 | | 2035 | 10 | (1) | (1)80 | (2,3)50 C | (2,3) | 0.79 | mono | 5.48 10$^{-4}$ |
| IV-137 | 24.40 | | 2035 | 175 | (1) | (1)80 | (2,3)50 C | (2,3) | 0.79 | mono | 7.08 10$^{-4}$ |
| IV-151 | 18.96 | | 1985 | 200 | | | | • | 0.76 | mono | 9.85 10$^{-4}$ |
| IV-151 | 18.96 | | 2035 | 200 | | | | • | 0.76 | mono | 8.60 10$^{-4}$ |
| IV-153 | 28.60 | | 1985 | 200 | • | | • 67 C | | 0.81 | mono | 5.72 10$^{-4}$ |
| IV-153 | 28.60 | | 2035 | 200 | • | | • 67 C | | 0.81 | mono | 4.62 10$^{-4}$ |
| IV-171 | 27.80 | | 2035 | 90 | • | | • 60 C | | 0.81 | mono | 4.26 10$^{-4}$ |
| IV-172 | 19.30 | | 2035 | 90 | | | • 75 C | | 0.79 | slow IIA | 7.34 10$^{-4}$ |

Fiber parameters for the GeO$_2$ doped MCVD fibers tested. Dopant concentrations are area weight averages. Core overlap integrals are calculated based on an estimated step index profile. Ranges indicate that more than one measurement was carried out on samples of the same fiber. *DC index, modulated index too weak to measure.

Figure 8

| Fiber | GeO$_2$ (area avg., wt%) | Other (area avg., wt%) | Draw temp. (C) | Draw tens. (g) | O$_2$/Cl$_2$ 300/50 sccm | GeCl$_4$ 50-280 sccm | 2-propanol | He 300 sccm | η | Growth type | 15' δ$_{NMOD}$ |
|---|---|---|---|---|---|---|---|---|---|---|---|
| IV-60 | 13 | 3.4 | 2035 | 90 | • | 280 | | | 0.91 | mono | 4.93 10$^{-4}$ |
| IV-69 | 16.1 | 8.8 | 2035 | 90 | • | 150 | | | 0.91 | mono | 4.7-5.1 10$^{-4}$ |
| IV-76 | 18.1 | 8.1 | 2035 | 90 | • | • | | | 0.80 | mono | 5.76 10$^{-4}$ |
| IV-81 | 12.8 | 10.8 | 2035 | 90 | • | • | | | 0.59 | mono | 7.09 10$^{-4}$ |
| IV-82 | 13 | 10 | 2035 | 90 | • | • | | | 0.74 | mono | 5.59 10$^{-4}$ |
| IV-83 | 11.9 | 11.4 | 2035 | 90 | • | 90 | | | 0.43 | mono | 9.24 10$^{-4}$ |
| IV-106 | 20.5 | 12.7 | 2035 | 90 | • | 90 | | | 0.80 | mono | 2.7-4.4 10$^{-4}$ |
| IV-108 | 23.7 | 14.8 | 2035 | 90 | • | 80 | | | 0.75 | IIA | 5.7-6.6 10$^{-4}$ |
| IV-118 | 21.78 | 16.31 | 2035 | ? | • | 81 | | | 0.87 | IIA | 3.9-4.1 10$^{-4}$ |
| IV-118 | 21.78 | 16.31 | 2035 | 30 | • | 81 | | | 0.87 | IIA | 5.38 10$^{-4}$ |
| IV-118 | 21.78 | 16.31 | 2035 | 90 | • | 81 | | | 0.87 | IIA | 6.07 10$^{-4}$ |
| IV-118 | 21.78 | 16.31 | 2035 | 200 | • | 81 | | | 0.87 | IIA | 7.35 10$^{-4}$ |
| IV-125 | 24.60 | 18.10 | 2035 | 10 | • | 280 | | | 0.88 | IIA | 4.81 10$^{-4}$ |
| IV-125 | 24.60 | 18.10 | 2035 | 150 | • | 280 | | | 0.88 | IIA | 6.20 10$^{-4}$ |
| IV-163 | 17.60 | 17.40 | 2035 | 90 | • | 280 | | • | 0.83 | IIA | 3.68 10$^{-4}$ |
| IV-164 | 18.00 | 19.20 | 2035 | 90 | | | • 60 C | • | 0.81 | IIA | 4.66 10$^{-4}$ |
| CMS fibers | | | | | | | | | | | |
| IV-122 θ=clad | 21.40 (4.58) | 4.00 (21.43) | 2035 | 90 | • | • | | | 1.00 | mono | 3.04 10$^{-4}$ |
| IV-168 θ=clad | 21.50 (10.59) | 14.60 (26.54) | 2035 | 90 | • | • | | | 1.00 | slow IIA | 6.86 10$^{-4}$ |

Fiber parameters for the GeO$_2$-B$_2$O$_3$-doped MCVD fibers tested. Dopant concentrations are area weight averages. Core overlap integrals are calculated based on an estimated step index profile. Ranges indicate more than one measurement on samples from the same fiber.

MAKING A PHOTOSENSITIVE FIBER WITH COLLAPSE OF A MCVD TUBE THAT IS IN A SMALL POSITIVE PRESSURE ATMOSPHERE

BACKGROUND OF THE INVENTION

1. Field of Invention

The present invention is generally directed to devices for optical communications, and more particularly to a method for making photosensitive fiber suitable for wavelength stabilization gratings.

2. Description of the Related Art

Wavelength stabilization gratings (also referred to as laser stabilization gratings) are weak fiber Bragg gratings used to lock a semiconductor laser to a particular emission wavelength. They are typically a few tenths of a nanometer wide and reflect a small percentage of the incident light, e.g. 1 to 10% of the guided power in the fiber.

Generally, wavelength stabilization gratings are fabricated using UV-induced index changes in a host fiber, such as a standard telecommunications type fiber. For 980-nm pump laser applications, these gratings are typically written in a 980-type fiber, such as Corning® CS-980™ fiber or Corning® Flexcor™ 1060 fiber. For 1480-nm pump laser applications, Raman amplifier pump applications, or signal laser applications, they may be fabricated in a fiber such as Corning® SMF-28™ fiber. Additionally, gratings may be written in a polarization-maintaining (PM) fiber such as Corning® PureMode™ PM Engineered fiber, PM 980 or PM 1550.

Hydrogen loading must be used with in standard telecommunications type fibers to get the change in index required to make wavelength stabilization gratings. Hydrogen loading involves placing fibers in a chamber pressurized with hydrogen for extended periods of time at very high pressures, e.g., up to 12 days at 20–750 atm pressure. The loaded fibers are then stored at very cold (e.g. −80° C.) temperatures to prevent outdiffusion of $H_2$. After grating formation, the gratings are thermally annealed to stabilize the index change, typically with a 24 hour anneal cycle at 140° C.

It would be preferable to remove the need for hydrogen loading. Hydrogen loading introduces several processing steps which may be preferable to avoid in manufacturing situations. This leads to increased manufacturing costs due to: increased processing steps, pressure chamber safety concerns, processing variability due to hydrogen outdiffusion, low temperature storage cost, and annealing requirements, among others. In addition, hydrogen loading is a long and expensive process. Therefore, it would be desirable to have a method of fabricating wavelength stabilization gratings which does not require hydrogen loading.

SUMMARY OF THE INVENTION

The present invention includes a method of making a preform for an enhanced photosensitive fiber comprising the steps of depositing successive layers of optical material inside a tube using modified chemical vapor deposition, and collapsing the successive layers of optical material in a reducing atmosphere with a positive pressure. Preferably, the positive pressure is between 0 and 1.0 torr. Additionally, the reducing atmosphere preferably comprises He.

The present invention also includes a method of making an enhanced photosensitive fiber comprising the steps of making a preform using modified chemical vapor deposition wherein the preform is collapsed in a reducing atmosphere with a positive pressure and drawing the preform into a fiber. Preferably, the positive pressure is between 0 torr and 1.0 torr. Additionally, the draw tension is preferably between 100 g and 250 g and the draw temperature is preferably between 1950° C. and 2100° C.

BRIEF DESCRIPTION OF THE DRAWINGS

The foregoing and other features, aspects and advantages of the present invention will become apparent from the following description, appended claims and the exemplary embodiments shown in the drawings, which are briefly described below.

FIG. 7 is a table summarizing the effect of various manufacturing parameters for $GeO_2$ doped MCVD fibers.

FIG. 8 is a table summarizing the effect of various manufacturing parameters for $GeO_2$—$B_2O_3$-doped MCVD fibers.

DETAILED DESCRIPTION OF THE PREFERRED EMBODIMENTS

The present inventors have determined that optical fibers with enhanced photosensitivity can be manufactured by the modified chemical vapor deposition (MCVD) process, also known as the inside vapor (IV) deposition process, with careful control of various process parameters. These process parameters include the collapse condition and draw conditions, including draw temperature and tension. For example, optical fibers can be fabricated without hydrogen loading that exhibit changes in index up to approximately $1 \times 10^{-3}$ when exposed to UV light. Thus, wavelength stabilization gratings can be fabricated in these fibers more quickly and at a significantly lower cost than using prior art procedures.

The degree of photosensitivity of an optical fiber manufactured by the MCVD process is a function of the collapse conditions and the draw conditions. FIGS. 7 and 8 summarize the effects of various collapse conditions on $GeO_2$ doped MCVD fibers and $GeO_2$—$B_2O_3$ doped fibers, respectively. Each preform was collapsed in three successive stages. In most cases, the three collapse conditions were identical, e.g., the gas flow composition was held constant. In some cases, however, gas composition was changed after the first collapse, but held constant during the second and third collapse. Gases used include $O_2$, $Cl_2$, $GeCl_4$, He, and 2-propanol. The helium is used to produce an oxygen deficient collapse. Solid bullets indicate a gas was present during all three collapse stages, while numbers in parentheses indicate a gas was used only during that particular collapse stage. Where exact $GeCl_4$ flow rate is known, it is specified. Bullets indicate an unknown flow rate between 50–280 sccm $GeCl_4$. The temperature of the 2-propanol vessel was varied from room temperature up to 75° C., as indicated. The 2-propanol was used so that (1) hydrogen from 2-propanol might create the same effect as $H_2$ treatment and (2) carbon might create a reduced environment so that more oxygen deficient centers are created.

Figure 1:
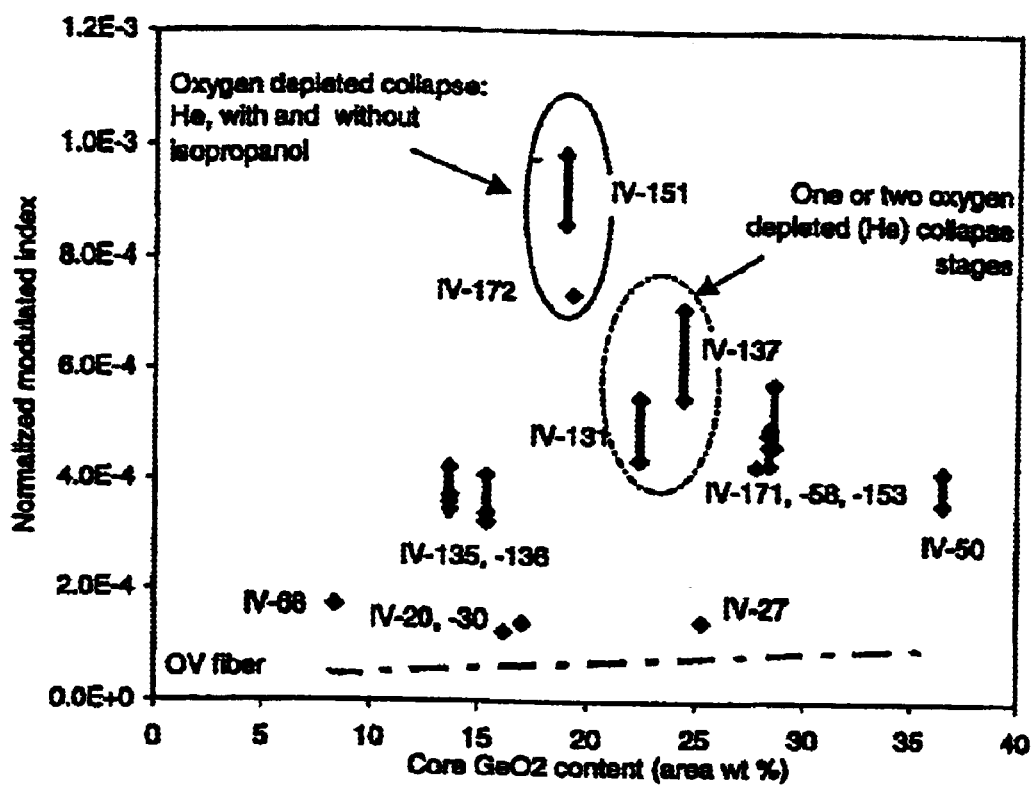
FIG. 1 is a plot illustrating the effect of an oxygen deficient collapse on the index.

FIG. 1 illustrates the effect of an oxygen deficient collapse on the index. The change in index was induced by exposing the fiber to a 240 nm UV laser operating at 10 Hz and a fluence of approximately 280 mJ/cm$^2$ for about 15 minutes. As can be seen in the figure, collapsing under oxygen deficient conditions results in significantly higher photosensitivity. The highest changes in index are produced when all three collapse stages are oxygen deficient (solid oval). However, having at least one oxygen deficient collapse stage also results in improved photosensitivity (dotted oval). The fibers with the lowest photosensitivity were fabricated by the outside vapor (OV) process. In the preferred embodiment of the invention, oxygen deficiency is achieved by using helium as the primary gas. However, other inert gases, such as argon and nitrogen may also be used.

In addition to collapsing with an oxygen deficiency, the inventors have determined that it is desirable to collapse under positive pressure. Preferably, the collapse pressure should be between 0 and 1 torr. More preferably, the collapse pressure should be between 0 and 0.5 torr. Most preferably, the collapse pressure should be between 0.2 and 0.4 torr.

In the preferred embodiment of the invention, the preform is doped with Ge. However, the preform may also be co-doped with $B_2O_3$. This is especially advantageous for the fabrication of cladding mode suppression (CMS) fibers. CMS fibers are designed to have both a photosensitive core and a photosensitive cladding layer.

Figure 2:
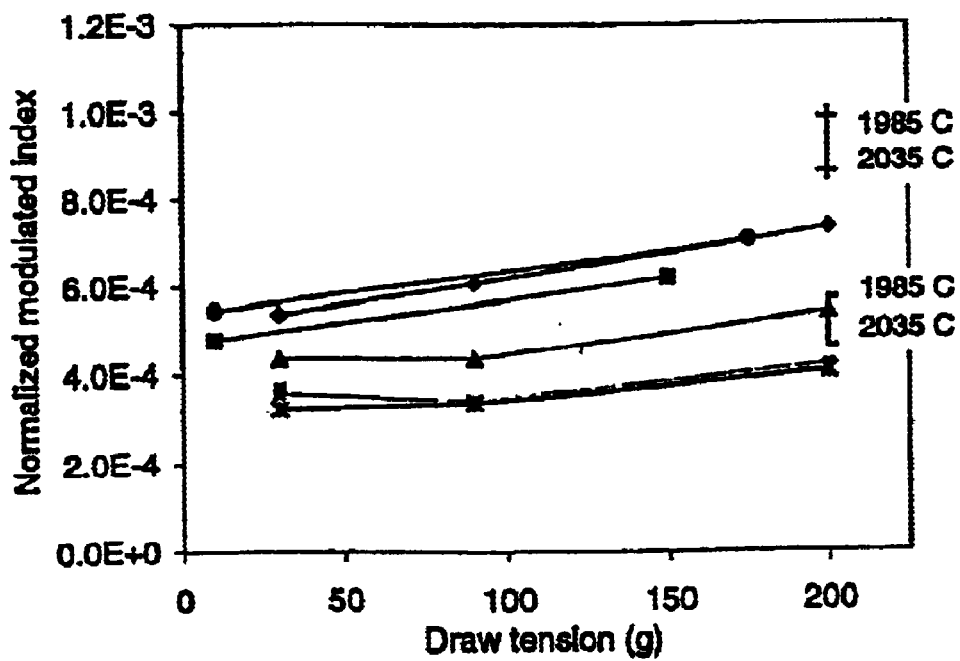
FIG. 2 is a plot illustrating the effect of draw tension on the index.

The effect of draw conditions on the photosensitivity is illustrated in FIG. 2. An increase in draw tension increases the photosensitivity of the fiber. Further, a decrease in draw temperature increases the photosensitivity. This increase in photosensitivity was produced in both Ge-doped fibers and B-Ge-doped fibers. In the preferred embodiment of the invention, the preform is drawn with both a high tension and under low temperature. Preferably, the draw tension is between 100 g and 250 g. More preferably, the draw tension is between 150 g and 200. The draw temperature is preferably between 1950° C. and 2100° C. More preferably the draw temperature is between 1980° C. and 2050° C. Most preferably, the draw temperature is between 1980° C. and 1990° C.

Figure 3:
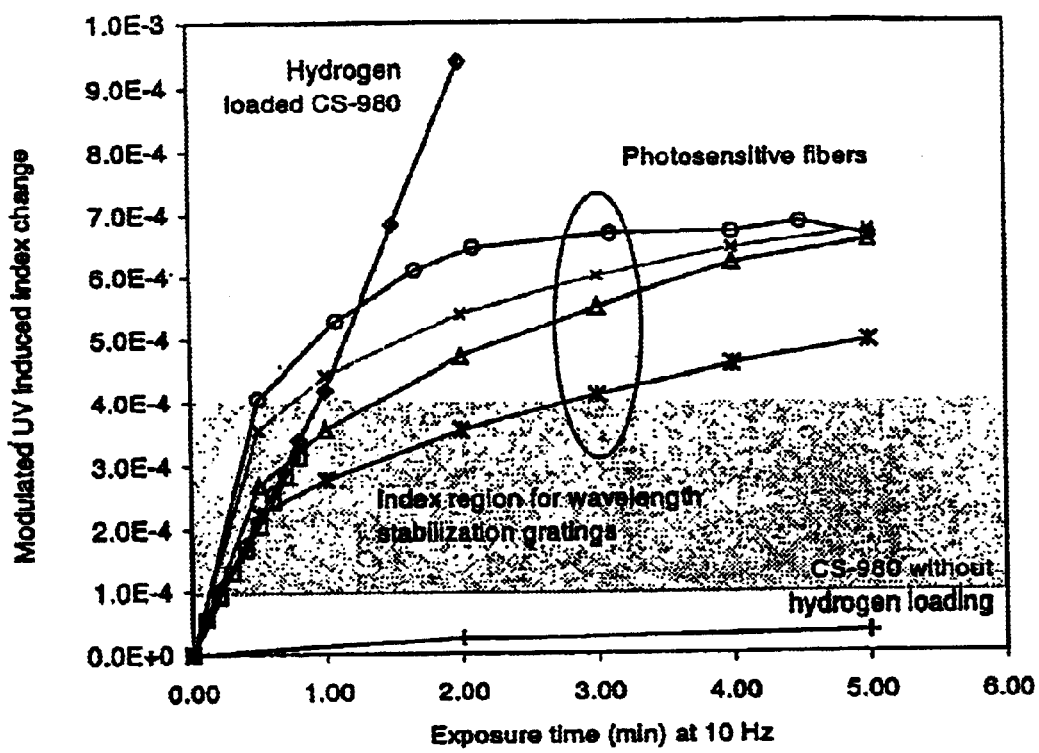
FIG. 3 is a plot illustrating the index as a function of exposure time.
Figure 4:
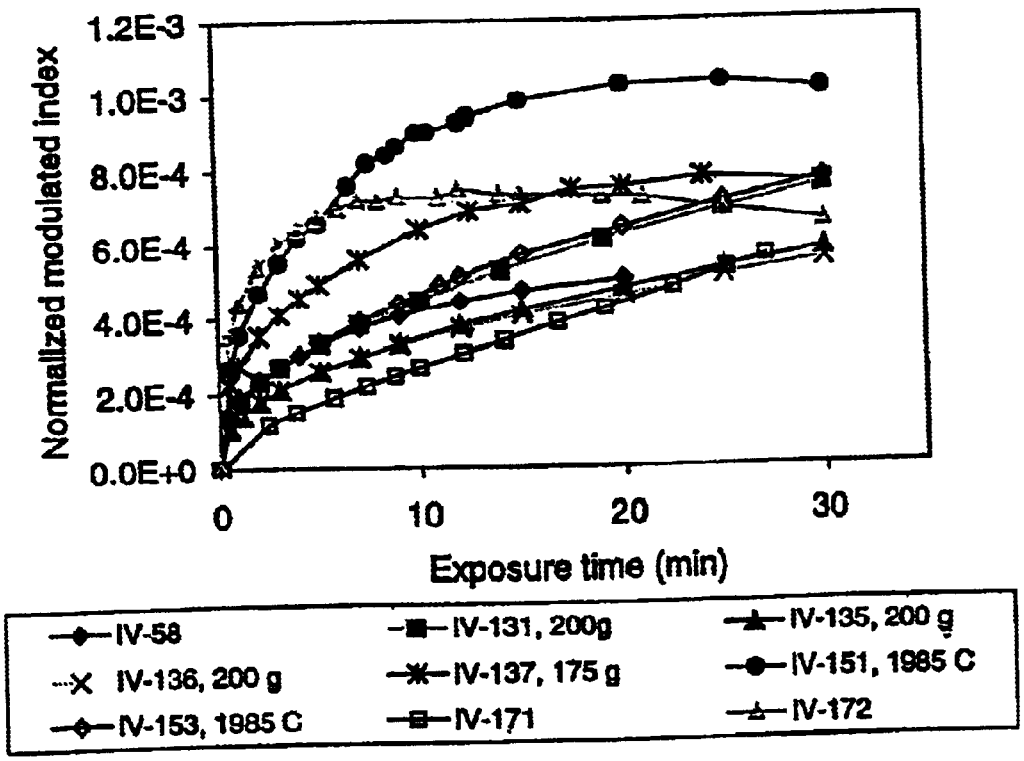
FIG. 4 is a plot illustrating the index as a function of exposure time.

FIGS. 3 and 4 are plots of the normalized modulated index of a assortment of $GeO_2$ doped fibers as a function of exposure time. The figures illustrate that both the degree of photosensitivity, as measured by the magnitude of the change in index, and the rate of change of the index is a function of the various process parameters. A combination of a preform collapsed with three oxygen deficient stages, high draw tension and low draw temperature produces the largest change in index and the fastest change in index. Collapse with oxygen, a low draw tension and a high draw temperature yields the smallest index and the slowest rate of change. By varying one or more of the parameters, intermediate degrees of photosensitivity and intermediate rates of change can be achieved.

Because the process parameters may be varied singly or in combination, it is possible to tailor and optimize the fiber response based on the desired end product. For example, it is possible to design a fiber which achieves an index suitable for laser stabilization gratings with an exposure of less than 15 minutes. Further, a fiber may be fabricated which achieves an index suitable for laser stabilization gratings with an exposure of less than 5 minutes. It is also possible to achieve a suitable index in less than 1 minute or even within 30 seconds.

Figure 5:
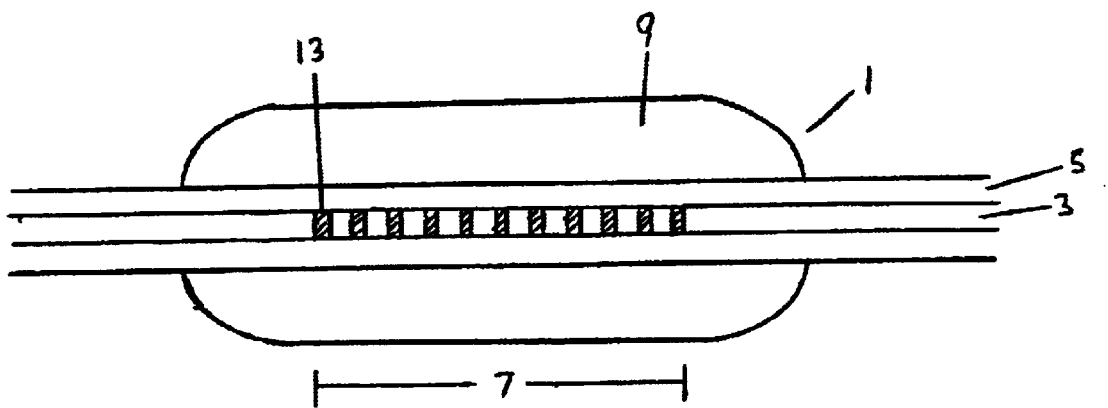
FIG. 5 is a cross section of a fiber Bragg grating according to a first embodiment of the invention.

FIG. 5 presents a cross section of a grating 1 in a fiber according to a first embodiment of the invention. The grating may be a fiber Bragg grating, a long period fiber grating, a laser stabilization grating or any other type of grating. The grating 1 has a core 3 comprising a material with enhanced photosensitivity. Example materials include, but are not limited to germanium doped silica and germanium and boron co-doped silica prepared from a preform collapsed in a reducing atmosphere with a positive pressure. Preferably, the core 3 is surrounded by a cladding layer 5 which has an index of refraction lower than the index of refraction of the core.

Figure 6:
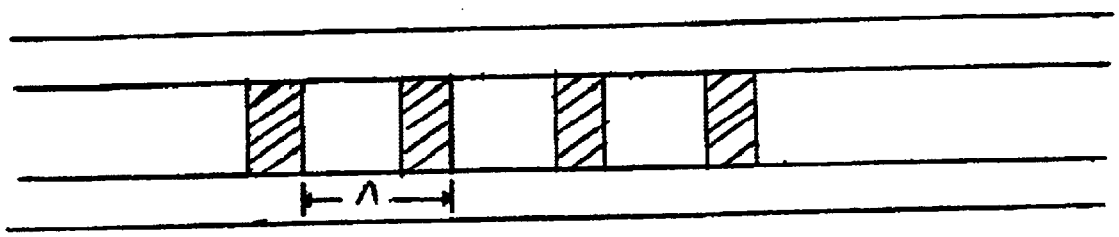
FIG. 6 is a cross section of a first embodiment of the invention illustrating the definition of the grating period Λ.

Within the core 3, is a region 7 which contains a regular array of periodic, permanent perturbations 13 of the index of refraction. The array of perturbations 13 form an optical grating having a grating period $\Lambda$. FIG. 6 illustrates the grating period $\Lambda$. The array of perturbations 13 are formed by exposing the fiber to UV light pulses through a mask. Preferably, the light is supplied from a 240 nm frequency doubled 480 nm dye laser pumped by a 351 nm excimer laser, however other lasers may be used. For example, the following lasers may also be used: 248 nm KrF excimer, 193 nm ArF excimer, 244 nm continuous wavelength frequency doubled Ar and other UV lasers with wavelengths in the range of 190 nm to 350 nm.

Preferably, the laser stabilization gratings are made from fibers drawn with a large tension and at a low draw temperature. However, it is not necessary that the tension be large and the draw temperature be low. It is sufficient that the combination of processing parameters produce a fiber with a high enough photosensitivity such that exposure to UV radiation increases the index enough to form laser stabilization gratings without hydrogen loading the fiber.

The foregoing description of the invention has been presented for purposes of illustration and description. It is not intended to be exhaustive or to limit the invention to the precise form disclosed, and modifications and variations are possible in light of the above teachings or may be acquired from practice of the invention. The drawings and description were chosen in order to explain the principles of the invention and its practical application. It is intended that the scope of the invention be defined by the claims appended hereto, and their equivalents.

What is claimed is:

1. A method of making a preform for an enhanced photosensitive fiber comprising the steps of:

depositing successive layers of optical material the inside a tube using modified chemical vapor deposition; and collapsing the successive layers of optical material in a reducing atmosphere with a positive pressure, wherein the positive pressure is 0 to 1.0 torr.

2. A method according to claim 1, wherein the positive pressure is 0 to 0.5 torr.

3. A method according to claim 2, wherein the positive pressure is 0.2 to 0.4 torr.

4. A method according to claim 1, wherein the reducing atmosphere comprises $GeCl_4$.

5. A method according to claim 4, wherein the reducing atmosphere further comprises at least one of He, Ar, CO, COH and 2-propanol.

6. A method according to claim 1, wherein the optical material is doped with Ge.

7. A method according to claim 6, wherein the optical material is co-doped with boron.

8. A method of making an enhanced photosensitive fiber comprising the steps of:

making a preform using modified chemical vapor deposition wherein the preform is collapsed in a reducing atmosphere with a positive pressure, wherein the positive pressure is 0 to 1.0 torr; and drawing the preform into a fiber.

9. A method accruing to claim 8, wherein the positive pressure is 0 to 0.5 torr.

10. A method according to claim 9, wherein the positive pressure is 0.2 to 0.4 torr.

11. A method according to claim 8, wherein the step of drawing is conducted with a tension of 100 g to 250 g.

12. A method according to claim 11, wherein the step of drawing is conducted with a tension of 150 g to 200 g.

13. A method according to claim 12, wherein the step of drawing is conducted at a temperature of 1950 C. to 2100 C.

14. A method according to claim 13, wherein the step of drawing is conducted at a temperature of 1980 C. to 2050 C.

15. A method of making a fiber grating comprising the steps of:

making a preform using modified chemical vapor deposition wherein the preform is collapsed in a reducing atmosphere with a positive pressure, wherein the positive pressure is 0 to 1.0 torr;

drawing the preform into a fiber; and exposing the enhanced photosensitive fiber to ultraviolet light to form a grating pattern.

16. The method of claim 15, wherein the step of exposing is completed within 15 minutes.

17. The method of claim 16, wherein the step of exposing is completed within 5 minutes.

18. The method of claim 17, wherein the step of exposing is completed within 1 minute.

19. The method of claim 18, wherein the step of exposing is completed within half a minute.

20. The method of claim 15, wherein the grating pattern forms a fiber Bragg grating.

21. The method of claim 15, wherein the grating pattern forms a long period fiber grating.

22. The method of claim 15, wherein the grating pattern forms a laser stabilization grating.

* * * * *